United States Patent
Fan et al.

(10) Patent No.: US 9,974,059 B2
(45) Date of Patent: May 15, 2018

(54) METHOD AND APPARATUS FOR CONTROL INFORMATION TRANSMISSION

(71) Applicant: Telefonaktiebolaget LM Ericsson (publ), Stockholm (SE)

(72) Inventors: Rui Fan, Beijing (CN); Qianxi Lu, Beijing (CN); Mattias Tan Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/035,476

(22) PCT Filed: Apr. 21, 2016

(86) PCT No.: PCT/CN2016/079854
§ 371 (c)(1),
(2) Date: May 9, 2016

(87) PCT Pub. No.: WO2016/180203
PCT Pub. Date: Nov. 17, 2016

(65) Prior Publication Data
US 2017/0105207 A1    Apr. 13, 2017

(30) Foreign Application Priority Data

May 14, 2015  (WO) ................. PCT/CN2015/078940

(51) Int. Cl.
*H04W 72/04* (2009.01)
*H04W 16/14* (2009.01)

(52) U.S. Cl.
CPC ....... *H04W 72/0406* (2013.01); *H04W 16/14* (2013.01)

(58) Field of Classification Search
CPC ........... H04W 72/0406; H04W 72/042; H04W 72/04; H04W 16/14
See application file for complete search history.

(56) References Cited

U.S. PATENT DOCUMENTS

| 9,655,048 B2 * | 5/2017 | Liu | H04W 52/0229 |
| 2002/0186660 A1 * | 12/2002 | Bahadiroglu | H04J 3/14 |
| | | | 370/241 |

(Continued)

FOREIGN PATENT DOCUMENTS

| CN | 103188711 A | 7/2013 |
| CN | 104363598 A | 2/2015 |
| CN | 104540230 A | 4/2015 |

OTHER PUBLICATIONS

International Search Report and the Written Opinion of the International Searching Authority from counterpart PCT Application No. PCT/CN2016/079854, dated Jul. 7, 2016, 12 pages.

(Continued)

*Primary Examiner* — Wei Zhao
(74) *Attorney, Agent, or Firm* — NDWE LLP (57) ABSTRACT

A solution for control information transmission applicable in a Licensed-Assisted Access scenario. A method at a first communications device operable in both a licensed spectrum and an unlicensed spectrum. The method starts by checking whether there is a granted resource on a licensed carrier of the licensed spectrum. If there is a granted resource on the licensed carrier, then control information is transmitted via the granted resource on the licensed carrier to a second communications device that is operable in both the licensed spectrum and the unlicensed spectrum; otherwise, it is checked whether there is a granted resource on an unlicensed carrier of the unlicensed spectrum. If there is a granted resource on the unlicensed carrier, then transmission of the control information to the second communications device is attempted via the granted resource on the unlicensed carrier. Correspondingly, there is also provided an apparatus for the control information transmission.

27 Claims, 4 Drawing Sheets

(56) References Cited

U.S. PATENT DOCUMENTS

2012/0250631 A1    10/2012  Hakola et al.
2014/0036818 A1*   2/2014   Koskela .............. H04W 72/042
                                                    370/329

OTHER PUBLICATIONS

3GPP TSG RAN Meeting #65, "Study on Licensed-Assisted Access using LTE," Sep. 9-12, 2014, 7 pages, RP-141664, Ericsson, Qualcomm, Huawei, Alcatel-Lucent.
ETSI TS 136 322, "LTE; Evolved Universal Terrestrial Radio Access (E-UTRA); Radio Link Control (RLC) protocol specification (3GPP TS 36.322 version 12.2.0 Release 12)", Apr. 2015, 43 pages, European Telecommunications Standards Institute.
International Preliminary Report on Patentability for Application No. PCT/CN2016/079854, dated Nov. 23, 2017, 7 pages.

* cited by examiner

METHOD AND APPARATUS FOR CONTROL INFORMATION TRANSMISSION

CROSS-REFERENCE TO RELATED APPLICATIONS

This application is a National stage of International Application No. PCT/CN2016/079854, filed Apr. 21, 2016, which claims priority to International Application No. PCT/CN2015/078940, filed May 14, 2015, which are hereby incorporated by reference.

TECHNICAL FIELD

The non-limiting and exemplary embodiments of the present disclosure generally relate to wireless communications, and specifically to a method and an apparatus for control information transmission at a communications device operable in both a licensed spectrum and an unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows both that demand for wireless broadband data is increasing, and that LTE is a successful platform to meet that demand. The existing and new spectrum licensed for exclusive use by International Mobile Telecommunications (IMT) technologies will remain fundamental for providing seamless coverage, achieving the higher spectral efficiency, and ensuring the higher reliability of cellular networks through careful planning and deployment of high-quality network equipment and devices.

In order to meet the ever increasing data traffic demand from users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service offering. While the unlicensed spectrum may not match the qualities of the licensed regime, solutions that allow an efficient use of it as a complement to licensed deployments have a potential to bring a great value to 3GPP operators, and ultimately to the 3GPP industry as a whole. This type of solutions would enable operators and vendors to leverage the existing or planned investments in LTE/Evolved Package Core (EPC) hardware in radio and core networks.

Figure 1:
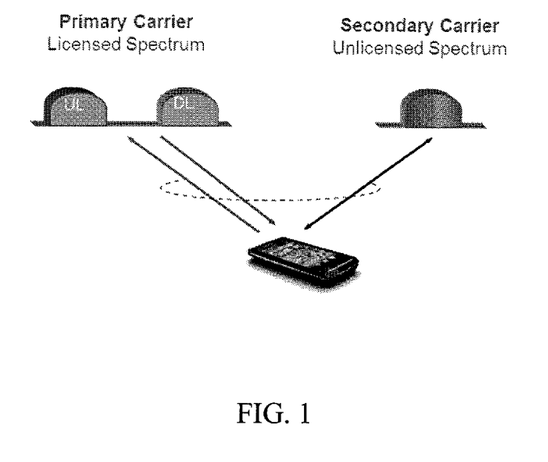
FIG. 1 shows an illustrative LTE network that can configure a UE to aggregate additional secondary cells which are using frequency carriers in the unlicensed spectrum.

It has been agreed to study Licensed-Assisted Access (LAA) technologies in the 3GPP at RP-141664. This LAA framework builds on carrier aggregation solutions introduced in LTE Release-10 to access the additional bandwidth in the unlicensed spectrum. FIG. 1 shows an illustrative LTE network that configures a user equipment, UE, to aggregate additional secondary cells (SCells) which are using frequency carriers in the unlicensed spectrum. The primary cell (PCell) maintains exchange of essential control messages and also offers an always-available robust spectrum, i.e. the licensed spectrum, for real-time and high-value traffic. Via the high-quality and robust licensed spectrum, the PCell may also provide mobility handling and management for the UE. The aggregated SCells in the unlicensed spectrum, when available, can be utilized as a bandwidth booster to serve, e.g. the best effort traffic. The LAA SCells may operate in a downlink (DL)-only mode or operate with both uplink (UL) and DL traffic.

However, in the existing LTE systems, control information and data are usually transmitted on licensed carriers only. There is no a solution adapted for LAA systems to leverage resources on both licensed and unlicensed carriers so as to further improve transmission performance.

SUMMARY

Various embodiments of the present disclosure mainly aim at providing an efficient solution for control information transmission in the LAA scenario. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for control information transmission. The method is performed at a first communications device operable in both a licensed spectrum and an unlicensed spectrum. The method starts by checking whether there is a granted resource on a licensed carrier of the licensed spectrum. If there is a granted resource on the licensed carrier, then control information is transmitted via the granted resource on the licensed carrier to a second communications device that is operable in both the licensed spectrum and the unlicensed spectrum; otherwise, it is checked whether there is a granted resource on an unlicensed carrier of the unlicensed spectrum. If there is a granted resource on the unlicensed carrier, then transmission of the control information to the second communications device is attempted via the granted resource on the unlicensed carrier.

According to this method, the control information may be preferentially transmitted on a licensed carrier so as to take the best advantage of the licensed carrier. Meanwhile, the method offers an additional opportunity to transmit the control information on an unlicensed carrier and gain may be achieved if transmission via the unlicensed carrier succeeds, for example a delay possibly caused by waiting for available resources on the licensed carrier may be reduced.

In an embodiment, attempting transmission of the control information via the granted resource on the unlicensed carrier may be implemented through the following operations: maintaining a copy of the control information, preferably at the MAC layer; checking whether the granted resource on the unlicensed carrier can be exclusively occupied by the first communications device; and transmitting the control information via the granted resource on the unlicensed carrier to the second communications device if the granted resource can be exclusively occupied by the first communications device.

According to this embodiment, the control information may be transmitted on the unlicensed carrier only when there is an exclusive resource available for it such that the quality or robustness of the transmission on the unlicensed carrier may be improved.

In another embodiment, if the granted resource on the unlicensed carrier cannot be exclusively occupied by the first communications device, or if no acknowledgement is received from the second communications device in response that the control information is transmitted via the granted resource on the unlicensed carrier, it may be further checked whether there is a granted resource on a licensed carrier of the licensed spectrum. If there is a granted resource on the licensed carrier, then the copy of the control information may be retransmitted via the granted resource on the licensed carrier; otherwise, it may be checked whether there is a granted resource on another unlicensed carrier of the unlicensed spectrum. If there is a granted resource on the other unlicensed carrier, retransmission of the copy of the control information to the second communications device may be attempted via the granted resource on the other unlicensed carrier.

According to this embodiment, the robustness of the control information transmission may be improved by introducing a retransmission scheme. Furthermore, when the unlicensed carrier couldn't offer successful transmission of the control information, the method can switch to the licensed carrier immediately so as to avoid meaningless waiting on the unlicensed carrier and the unnecessary delay caused thereby.

In yet another embodiment, the copy of the control information may be updated so as to reflect the change in the control information over time. In this embodiment, retransmission of the copy of the control information comprises transmission of the updated copy of the control information.

In yet another embodiment, retransmission of the copy of the control information may be performed after a first predetermined time period elapses since a previous transmission of the control information so as to avoid too often retransmission and to reduce the signaling overhead caused thereby.

In yet another embodiment, the copy of the control information may be discarded in response that an acknowledgement is received from the second communications device or in response that the copy has been maintained over a second predetermined time period so as to avoid the control information becoming obsolete when it finally reaches the second communications device.

In yet another embodiment, the first communications device may be a terminal device and the second communications device may be a base station. In this embodiment, the granted resource may be indicated by an uplink grant transmitted from the second communications device to the first communications device.

In yet another embodiment, the first communications device may be a base station and the second communications device may be a terminal device.

In a second aspect of the present disclosure, there is provided an apparatus for control information transmission. The apparatus may be embodied at or as at least part of a first communications device operable in both a licensed spectrum and an unlicensed spectrum. The first communications device may be a base station or a terminal device. The apparatus comprises a checking unit, a transmitting unit and a transmission attempting unit. The checking unit is configured to check whether there is a granted resource on a licensed carrier of the licensed spectrum. The transmitting unit is configured to transmit control information, if there is a granted resource on the licensed carrier, via the granted resource on the licensed carrier to a second communications device that is operable in both the licensed spectrum and the unlicensed spectrum. The second communications device may correspondingly be a terminal device or a base station. In this embodiment, the checking unit is further configured to check whether there is a granted resource on an unlicensed carrier of the unlicensed spectrum if there is no granted resource on the licensed carrier. The transmission attempting unit is configured to attempt transmission of the control information, if there is a granted resource on the unlicensed carrier, via the granted resource on the unlicensed carrier to the second communications device.

In an embodiment, the transmission attempting unit may further comprise a maintaining unit that is configured to maintain a copy of the control information, preferably at the MAC layer. In this embodiment, the checking unit may be further configured to check whether the granted resource on the unlicensed carrier can be exclusively occupied by the first communications device. The transmission attempting unit may be further configured to transmit the control information, if the granted resource can be exclusively occupied by the first communications device, via the granted resource on the unlicensed carrier to the second communications device.

In a further embodiment, the checking unit may be further configured to check whether there is a granted resource on a licensed carrier of the licensed spectrum, if the granted resource on the unlicensed carrier cannot be exclusively occupied by the first communications device, or if no acknowledgement is received from the second communications device in response that the control information is transmitted via the granted resource on the unlicensed carrier. In this embodiment, the transmitting unit may be further configured to retransmit the copy of the control information, if there is a granted resource on the licensed carrier, via the granted resource on the licensed carrier. The checking unit may be further configured to check whether there is a granted resource on another unlicensed carrier of the unlicensed spectrum, if there is no granted resource on the licensed carrier. The transmission attempting unit may be further configured to attempt retransmission of the copy of the control information, if there is a granted resource on the other unlicensed carrier, via the granted resource on the other unlicensed carrier to the second communications device.

In another embodiment, the maintaining unit may be further configured to update the copy of the control information. In this embodiment, retransmission of the copy of the control information comprises transmission of the updated copy of the control information.

In yet another embodiment, retransmission of the copy of the control information may be performed after a first predetermined time period elapses since a previous transmission of the control information.

In yet another embodiment, the apparatus may further comprise a discarding unit. The discarding unit may be configured to discard the copy of the control information in response that an acknowledgement is received from the second communications device or in response that the copy has been maintained over a second predetermined time period.

In yet another embodiment, the first communications device may be a terminal device and the second communications device may be a base station. In this embodiment, the granted resource may be indicated by an uplink grant transmitted from the second communications device to the first communications device.

In yet another embodiment, the first communications device may be a base station and the second communications device may be a terminal device.

In a third aspect of the present disclosure, there is provided an apparatus for control information transmission. The apparatus may be embodied at or as at least part of a communications device operable in both a licensed spectrum and an unlicensed spectrum. The communications device may be a base station or a terminal device. The apparatus comprises a processor and a memory. The memory containing instructions executable by the processor, whereby the apparatus is operative to perform the method according to the first aspect of the present disclosure.

In a fourth aspect of the present disclosure, there is provided an apparatus for control information transmission. The apparatus may be embodied at or as at least part of a communications device operable in both a licensed spectrum and an unlicensed spectrum. The communications device may be a base station or a terminal device. The apparatus comprises processing means adapted to perform the method according to the first aspect of the present disclosure.

In a fifth aspect of the present disclosure, there is provided a computer program. The computer program comprises instructions which, when executed on at least one processor, cause the at least one processor to carry out the method according to the first aspect of the present disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station", used herein may also be referred to as e.g. eNB, eNodeB, NodeB or base transceiver station (BTS), Access Node (AN) or Access Point (AP) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. In this document, the terms "base station" and "eNB" are used interchangeably, while the terms "terminal device" and "UE" are used interchangeably. The term "communications device" used herein may refer to any device operable in both a licensed spectrum and an unlicensed spectrum to conduct wireless communications, which may comprise a base station and a terminal device.

Generally speaking, licensed carrier quality is better than unlicensed carrier quality, e.g. more reliable and more robust. Therefore, some delay-sensitive information, such as control information, is preferably transmitted on licensed carriers, while unlicensed carriers are used for data traffic. Thus, in the case that a UE has important control information to transmit, but only an uplink (UL) grant on an unlicensed carrier is received, if the UE insists on transmission of the control information via the licensed carriers and ignores the transmission opportunity on the unlicensed carrier, a delay may be introduced for waiting for the UL grant on the licensed carrier. Even though the UE chooses to attempt transmitting the control information via the unlicensed carrier, the attempt may fail due to the Listen Before Talk (LBT) failure on the unlicensed carrier and thus an additional delay may also be introduced. The LBT refers to the Carrier Sense Multiple Access with Collision Detection (CSMA/CA) scheme for mediating the access to a transmission resource, particularly on unlicensed carriers. A UE is allowed to access a transmission resource only when the LBT for that resource succeeds, i.e. the resource can be exclusively occupied by the UE. That the resource can be exclusively occupied means no other UEs e.g. from another LAA system or a Wireless Fidelity (WiFi) system can utilize this resource for transmission.

Embodiments of the present disclosure provide an efficient solution for control information transmission, particularly in the LAA systems. Those skilled in the art, however, shall understand that although the solution is proposed specifically for the control information transmission, its principle and concept may be more generally applicable to any other information or data transmission in any communications system involving use of both licensed and unlicensed spectrums. The control information discussed herein may comprise, but not limited to, Radio Resource Control (RRC) signaling, a Packet Data Convergence Protocol (PDCP) control Protocol Data Unit (PDU), a control PDU at the Radio Link Control (RLC) layer, such as a RLC status report, and a control PDU at the Media Access Control (MAC) layer, such as a MAC control element (CE).

In the following description, it takes UL transmission (i.e. a terminal device acts as the transmitting party and a base station acts as the receiving party) as an example for the purpose of illustrating the principle and concept of embodiments of the present disclosure. It shall be appreciated that this principle and concept are equivalently applicable to Downlink (DL) transmission with the transmitting party and the receiving party being reversed, i.e. a terminal device acts as the receiving party and a base station acts as the transmitting party. Furthermore, the base station and terminal device in discussion hereafter are all operable in both a licensed spectrum and an unlicensed spectrum.

According to embodiments of the present disclosure, when a terminal device has control information to transmit to a base station, it first checks whether there is a granted resource on a licensed carrier via which the terminal device can conduct UL transmission. The granted resource may be indicated by a UL grant on the licensed carrier that is transmitted from the base station to the terminal device.

If there is a UL grant on the licensed carrier, i.e. there is a granted resource on the licensed carrier, the terminal device will transmit the control information via that granted resource on the licensed carrier. Otherwise, the terminal device will check whether there is a granted resource on an unlicensed carrier, which may be indicated by a UL grant on the unlicensed carrier transmitted from the base station to the terminal device.

If there is a UL grant on the unlicensed carrier, i.e. there is a granted resource on the unlicensed carrier, the terminal device may attempt transmitting the control information via that granted resource on the unlicensed carrier. Otherwise, the terminal device may have to wait for a UL grant from the base station preferably on a licensed carrier or alternatively on another unlicensed carrier.

Since the unlicensed spectrum is shared at the same time by more than one system, e.g. an LAA system and a WiFi system, transmission on the unlicensed carrier follows the LBT scheme as mentioned above so that a terminal device can make sure of exclusive occupation of a certain resource before its transmission, thereby eliminating the possibility of transmission failure due to collision with other devices and also ensuring a certain level of channel quality. In consideration of this, once the terminal device has received a UL grant on the unlicensed carrier, i.e. has been scheduled by the base station on the granted resource indicated by the UL grant, the terminal device may perform the LBT so as to obtain an exclusive occupation of the granted resource according to an embodiment of the present disclosure.

If the LBT for the granted resource succeeds, i.e. the granted resource can be exclusively used by the terminal device, then the terminal device may transmit the control information via the granted resource on the unlicensed carrier; otherwise the terminal device needs to check again whether there is a UL grant on the licensed carrier or further checks whether there is a UL grant on another unlicensed carrier. The checking operations and those afterwards are the same as mentioned above and thus omitted herein.

However, in the case that the terminal device succeeds in the LBT and the control information is transmitted via the granted resource on the unlicensed carrier, there is still a possibility that the control information cannot be successfully received by the base station e.g. due to a poor radio condition or an unforeseen collision. Therefore, in order to improve the robustness of the transmission, the Hybrid Automatic ReQuest (HARQ) protocol in LTE may be adopted. According to the HARQ protocol, the receiving party (in this instance, the base station) may indicate the transmitting party (in this instance, the terminal device) that the transmission was or was not successfully received by sending an acknowledgement (ACK) or a negative acknowledgement (NACK) to the transmitting party. However, since the receiving party, i.e. the base station also needs to perform the LBT before transmitting the ACK or NACK, even though the control information was successfully received by the base station, there is a possibility that the transmitting party, i.e. the terminal device, receives no ACK since the base station may fail in the LBT. Furthermore, the terminal device may also fail to receive an ACK due to the discontinuous reception (DTX).

In such a case that the terminal device receives no ACK in response to transmitting the control information to the base station, retransmission of the control information may be required.

In the current LTE systems, the retransmission may follow the HARQ protocol or the Radio Link Control (RLC) protocol. According to the HARQ protocol, data packets are maintained at a HARQ buffer. Retransmission of the data packets is bound with a carrier, which means these packets can only be retransmitted via the original carrier on which the packets were initially transmitted. Therefore, it is not possible to change the carrier during the HARQ retransmission. Likewise, retransmission of MAC CE over a carrier different from the original one is not possible. According to the RLC protocol as specified in 3GPP TS 36.322 V12.2.0, packets are maintained at the RLC layer just for RLC Acknowledged Mode (AM). These packets cannot be retransmitted until a RLC status PDU is received, which usually takes more than 10 milliseconds. For other control PDUs, such as PDCP control PDUs using RLC Unacknowledged Mode (UM), no retransmission opportunity is provided for them.

In order to overcome the drawback in the existing retransmission schemes, embodiments of the present disclosure propose maintaining a copy of the control information at the MAC layer before transmitting the control information via the granted resource on the unlicensed carrier.

Therefore, when the terminal device receives no ACK from the base station after transmitting the control information via the unlicensed carrier, it may use the copy of the control information maintained at the MAC layer for retransmission via a granted resource on the licensed carrier or via a granted resource on another unlicensed carrier that can be exclusively occupied by the terminal device.

In an embodiment, the terminal device may retransmit the copy of the control information after a predetermined time period elapses since the previous transmission so as to avoid too often retransmission and unnecessary signaling overhead caused thereby.

It should be appreciated that some control information, e.g. RLC status reports, may change over time. For example, the terminal device may attempt to transmit a buffer status report (BSR) at time T1 on a first carrier, but since no ACK was received from the base station, the terminal device may retransmit a copy of the BSR maintained at the MAC layer on a second carrier at time T2. Since there may have arrived additional data in the terminal device's buffer between time T1 and time T2, the terminal device may update the copy of the BSR so that the retransmitted copy of the BSR at time T2 may indicate a larger buffer size compared to the BSR transmitted at time T1.

In a further embodiment, upon successful transmission of the control information, the terminal device may discard the copy of the control information. For example, if the terminal device has transmitted particular control information in a data unit and the base station has successfully received it. Then the base station responds with an ACK (e.g. HARQ ACK). Upon reception of the ACK, the terminal device may assume that transmission of the control information has been successful and then discard the copy of the control information so as to refrain from sending it.

The terminal device may also discard the copy of the control information in response that the copy has been maintained over a predetermined time period. This ensures that the terminal device does not keep the control information indefinitely which may result in that the control information is obsolete when it reaches the base station.

Since DL transmission is scheduled by the base station, the base station has the knowledge of all granted resources for the DL transmission. Therefore, the only difference between the DL control information transmission and the UL control information transmission lies in that the base station does not need to receive a DL grant and can directly check granted resources for the DL transmission.

Figure 2:
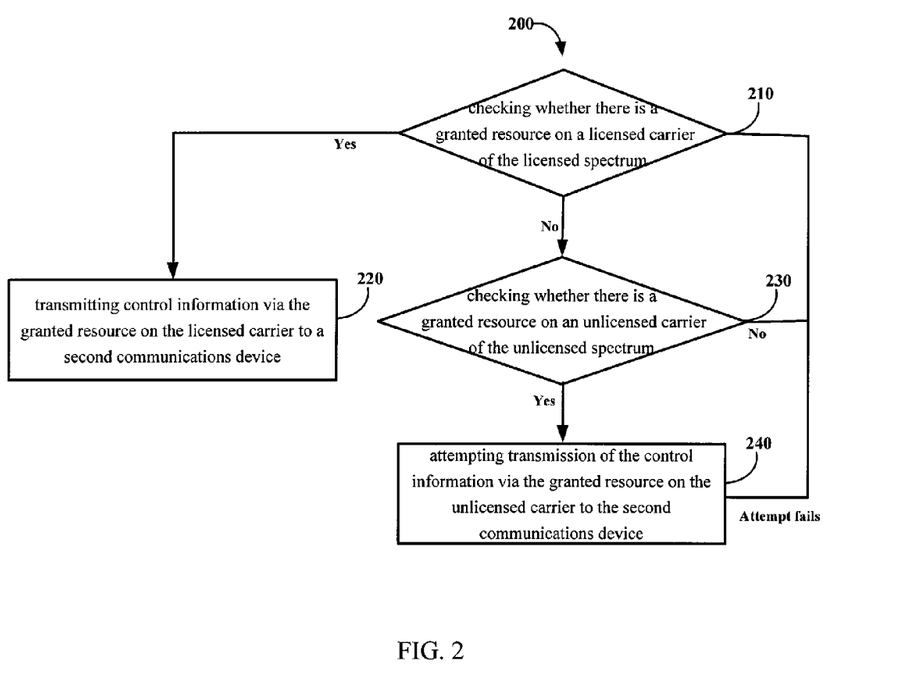
FIG. 2 illustrates a flowchart of a method for control information transmission according to an embodiment of the present disclosure.

FIG. 2 illustrates a flowchart of a method 200 for control information transmission according to an embodiment of the present disclosure. This method 200 is performed at a communications device (which will be referred to as a first communications device) that may be a base station or a terminal device, either of which is operable in a licensed spectrum and an unlicensed spectrum.

Particularly, the method 200 enters at block 210, in which it is checked whether there is a granted resource on a licensed carrier of the licensed spectrum.

If the checking result at block 210 shows that there is a granted resource on the licensed carrier, then control information is transmitted at block 220 via the granted resource on the licensed carrier to a second communications device that is operable in both the licensed spectrum and the unlicensed spectrum. The second communications device may correspondingly be the terminal device or the base station.

If the checking result at block 210 shows that there is no granted resource on the licensed carrier, then it is checked at block 230 whether there is a granted resource on an unlicensed carrier of the unlicensed spectrum.

If the checking result at block 230 shows that there is a granted resource on the unlicensed carrier, then transmission of the control information to the second communications device is attempted via the granted resource on the unlicensed carrier.

Additionally, if the attempt of the control information transmission fails, then the flow may go back to block 210 where a granted resource on the licensed carrier will be checked again.

In an embodiment that the first communications device is a terminal device and the second communications device is a base station, the granted resource on either the licensed carrier or the unlicensed carrier may be indicated by an uplink grant transmitted from the second communications device to the first communications device.

In another embodiment that the first communications device is a base station and the second communications device is a terminal device, the granted resource on either the licensed carrier or the unlicensed carrier are scheduled by the base station and thus can be checked directly by the first communications device.

According to the method 200, the control information may be preferentially transmitted on a licensed carrier so as to take the best advantage of the licensed carrier. Meanwhile, the method may offer an additional opportunity to transmit the control information on an unlicensed carrier and gain may be achieved if transmission via the unlicensed carrier succeeds, for example a delay possibly caused when the resource on the licensed carrier is not available may be reduced.

Figure 3:
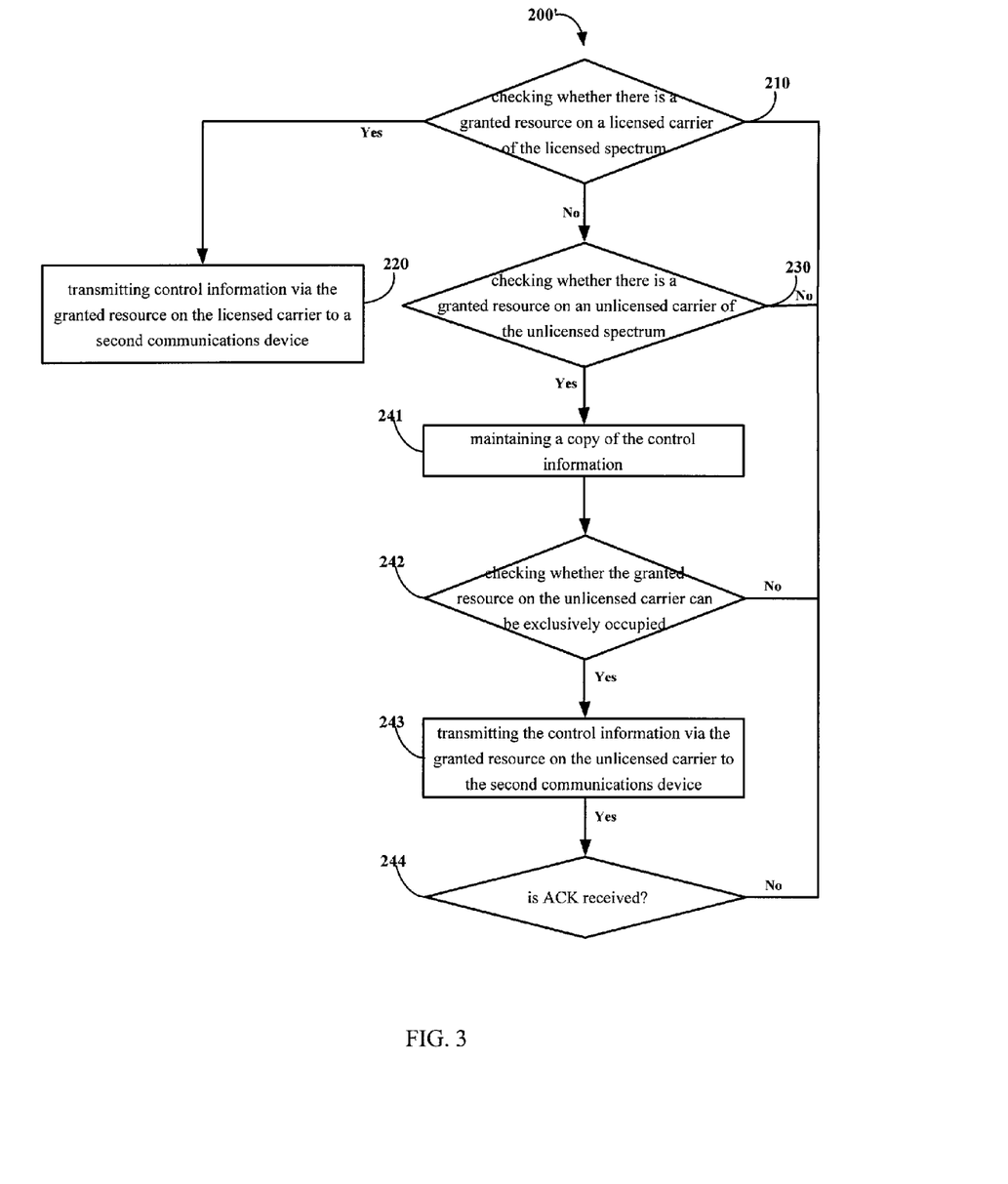
FIG. 3 illustrates a flowchart of the method for control information transmission according to other embodiments of the present disclosure.

FIG. 3 illustrates a more detailed flowchart of the method 200 (which is denoted as 200' in the figure) for control information transmission according to other embodiments of the present disclosure, in which the operations in blocks 210-230 are the same as those described with reference to FIG. 2 and thus are omitted herein.

A specific embodiment of the operation in block 240 of FIG. 2 will be described in reference to blocks 241-243 of FIG. 3.

In this embodiment, if the checking result at block 230 shows that there is a granted resource on the unlicensed carrier, a copy of the control information may be maintained at block 241, preferably at the MAC layer.

Then, it is checked at block 242 whether the granted resource on the unlicensed carrier can be exclusively occupied by the first communications device, e.g. by performing the LBT. If the LBT for the granted resource on the unlicensed carrier fails, it means that the granted resource cannot be exclusively occupied by the first communications device; otherwise if the LBT succeeds, it means that the granted resource can be exclusively occupied by the first communications device.

If the checking result at block 242 shows that the granted resource on the unlicensed carrier can be exclusively occupied by the first communications device, then the control information may be transmitted via the granted resource on the unlicensed carrier to the second communications device.

Otherwise, if the checking result at block 242 shows that the granted resource on the unlicensed carrier cannot be exclusively occupied by the first communications device, the flow will go back to block 210 to check again whether there is a granted resource on a licensed carrier of the licensed spectrum.

In this embodiment, if the checking result at block 210 shows that there is no granted resource on the licensed carrier, then it may be checked at block 230 whether there is a granted resource on another unlicensed carrier of the unlicensed spectrum.

If the checking result at block 230 shows that there is a granted resource on the other unlicensed carrier, then retransmission of the copy of the control information to the second communications device may be attempted via the granted resource on the other unlicensed carrier. The operations in blocks 241-243 will be repeated during that retransmission. In this case, maintaining the copy of the control information at block 241 may comprise updating the copy so as to reflect the change in the control information over time.

According to this embodiment, the control information can be transmitted on the unlicensed carrier only when there is an exclusive resource available for it such that the quality or robustness of the transmission on the unlicensed carrier may be improved. Furthermore, if the unlicensed carrier could not offer an effective transmission opportunity, the licensed carrier may be utilized immediately without introducing any negative effect.

In a further embodiment, it may be checked at block 244 whether an acknowledgement is received from the second communications device in response that the first communications device transmits the control information via the granted resource on the unlicensed carrier.

If the checking result at block 244 shows that no acknowledgement is received from the second communications device, then the flow will go back to block 210 to check again whether there is a granted resource on a licensed carrier of the licensed spectrum.

In this embodiment, if the checking result at block 210 shows that there is no granted resource on the licensed carrier, then it may be checked at block 230 whether there is a granted resource on another unlicensed carrier of the unlicensed spectrum.

If the checking result at block 230 shows that there is a granted resource on the other unlicensed carrier, then retransmission of the copy of the control information to the second communications device may be attempted via the granted resource on the other unlicensed carrier. The operations in blocks 241-243 will be repeated during that retransmission. In this case, maintaining the copy of the control information at block 241 may comprise updating the copy so as to reflect the change in the control information over time.

According to this embodiment, the robustness of the control information transmission may be improved by introducing a retransmission scheme. Furthermore, when the unlicensed carrier couldn't offer successful transmission of the control information, the method can switch to the licensed carrier immediately so as to avoid meaningless waiting on the unlicensed carrier and the unnecessary delay caused thereby.

In another embodiment, the copy of the control information may be retransmitted after a predetermined time period elapses since a previous transmission of the control information so as to avoid too often retransmission and to reduce the signaling overhead caused thereby.

In yet another embodiment, the copy of the control information may be discarded in response that an acknowledgement is received from the second communications device or in response that the copy has been maintained over a second predetermined time period so as to avoid the control information becoming obsolete when it finally reaches the second communications device.

Figure 4:
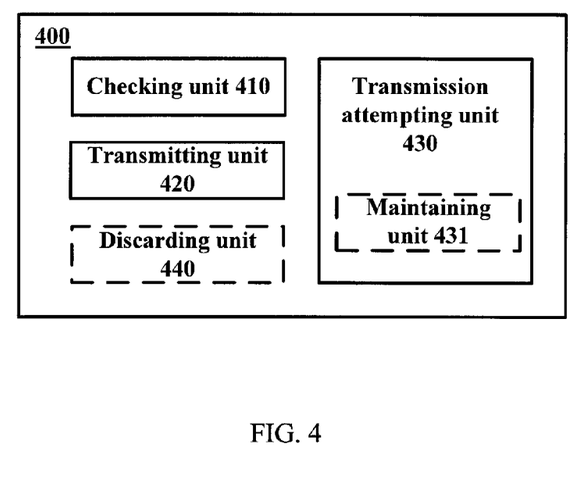
FIG. 4 illustrates a schematic block diagram of an apparatus for control information transmission according to an embodiment of the present disclosure.

FIG. 4 illustrates a schematic block diagram of an apparatus 400 for control information transmission according to an embodiment of the present disclosure. The apparatus may be embodied at or as at least part of a communications device (which will be referred to as a first communications device). The first communications device may be a base station or a terminal device, either of which is operable in a licensed spectrum and an unlicensed spectrum.

Particularly, the apparatus 400 comprises a checking unit 410, a transmitting unit 420 and a transmission attempting unit 430. The checking unit 410 is configured to check whether there is a granted resource on a licensed carrier of the licensed spectrum. The transmitting unit 420 is configured to transmit control information, if there is a granted resource on the licensed carrier, via the granted resource on the licensed carrier to a second communications device that is operable in both the licensed spectrum and the unlicensed spectrum. The second communications device may correspondingly be the terminal device or the base station. In this embodiment, the checking unit 410 is further configured to check whether there is a granted resource on an unlicensed carrier of the unlicensed spectrum if there is no granted resource on the licensed carrier. The transmission attempting unit 430 is configured to attempt transmission of the control information to the second communications device, if there is a granted resource on the unlicensed carrier, via the granted resource on the unlicensed carrier.

In an embodiment that the first communications device is a terminal device and the second communications device is a base station, the granted resource on either the licensed carrier or the unlicensed carrier may be indicated by an uplink grant transmitted from the second communications device to the first communications device.

In another embodiment that the first communications device is a base station and the second communications device is a terminal device, the granted resource on either the licensed carrier or the unlicensed carrier are scheduled by the base station and thus can be directly checked by the first communications device.

In yet another embodiment, the transmission attempting unit 430 may further comprise a maintaining unit 431 that is configured to maintain a copy of the control information, preferably at the MAC layer. In this embodiment, the checking unit 410 may be further configured to check whether the granted resource on the unlicensed carrier can be exclusively occupied by the first communications device; while the transmission attempting unit 430 may be further configured to transmit the control information to the second communications device via the granted resource on the unlicensed carrier, if that granted resource can be exclusively occupied by the first communications device.

In yet another embodiment, the checking unit 410 may be further configured to check whether there is a granted resource on a licensed carrier of the licensed spectrum, if the granted resource on the unlicensed carrier cannot be exclusively occupied by the first communications device, or if no acknowledgement is received from the second communications device in response that the control information is transmitted via the granted resource on the unlicensed carrier. In this embodiment, the transmitting unit 420 may be further configured to retransmit the copy of the control information, if there is a granted resource on the licensed carrier, via the granted resource on the licensed carrier. The checking unit 410 may be further configured to check whether there is a granted resource on another unlicensed carrier of the unlicensed spectrum, if there is no granted resource on the licensed carrier. The transmission attempting unit 430 may be further configured to attempt retransmission of the copy of the control information to the second communications device, if there is a granted resource on the other unlicensed carrier, via the granted resource on the other unlicensed carrier.

In yet another embodiment, the maintaining unit 410 may be further configured to update the copy of the control information. In this embodiment, retransmission of the copy of the control information may comprise transmission of the updated copy of the control information.

In yet another embodiment, retransmission of the copy of the control information may be performed after a first predetermined time period elapses since a previous transmission of the control information.

In yet another embodiment, the apparatus 400 may comprise a discarding unit 440 that is configured to discard the copy of the control information in response that an acknowledgement is received from the second communications device or in response that the copy has been maintained over a second predetermined time period.

The above units 410-440 and 431 may be configured to implement the corresponding operations or steps as described with reference to FIG. 2-3 and thus will not be detailed herein for the sake of brevity.

Figure 5:
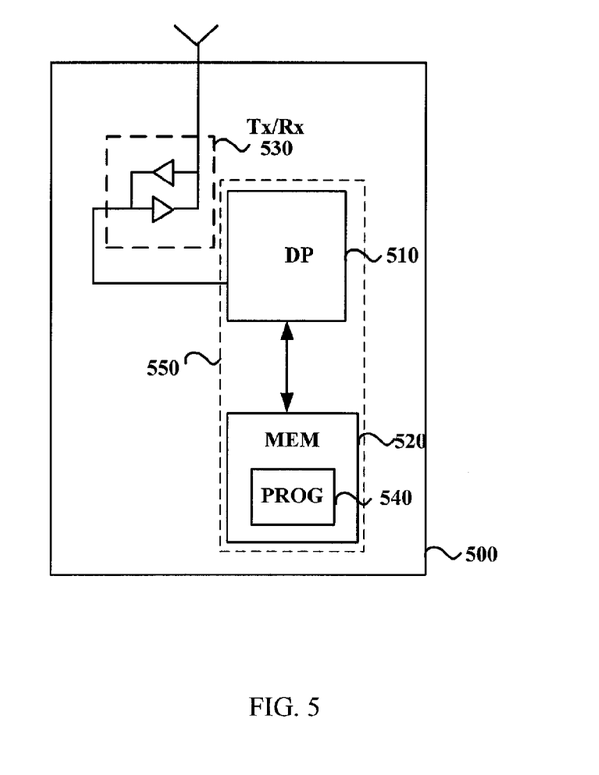
FIG. 5 illustrates a schematic block diagram of an apparatus adapted for control information transmission according to embodiments of the present disclosure.

FIG. 5 illustrates a schematic block diagram of an apparatus 500 adapted for control information transmission. The apparatus 500 may be embodied at or as a part of a communications device. The communications device may be a base station or a terminal device operable in both a licensed spectrum and an unlicensed spectrum according to embodiments of the present disclosure.

The apparatus 500 comprises at least one processor 510, such as a data processor (DP) and at least one memory (MEM) 520 coupled to the processor 510. The apparatus 500 may further comprise a transmitter TX and receiver RX 530 coupled to the processor 510 for establishing wire communications with other communications devices. The MEM 520 stores a program (PROG) 540. The PROG 540 may include instructions that, when executed on the associated processor 510, enable the apparatus 500 to operate in accordance with the embodiments of the present disclosure, for example to perform the method 200. A combination of the at least one processor 510 and the at least one MEM 520 may form processing means 550 adapted to implement some embodiments of the present disclosure.

The MEM 520 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 510 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for control information transmission at a first communications device configured to utilize both a licensed spectrum and an unlicensed spectrum, the control information for controlling data transmission, comprising:

checking whether there is a granted resource on a licensed carrier of the licensed spectrum to transmit the control information to a second communications device that is also configured to utilize both the licensed spectrum and the unlicensed spectrum;

if there is a granted resource on the licensed carrier, then transmitting the control information via the granted resource on the licensed carrier to the second communications device;

checking whether there is a granted resource on an unlicensed carrier of the unlicensed spectrum to transmit the control information, if there is no granted resource on the licensed carrier to transmit the control information; and if there is a granted resource on the unlicensed carrier, then transmitting the control information via the granted resource on the unlicensed carrier to the second communications device, instead of on the licensed carrier.

2. The method according to claim 1, wherein the transmitting of the control information via the granted resource on the unlicensed carrier further comprises:
maintaining a copy of the control information;
checking whether the granted resource on the unlicensed carrier is exclusively occupied by the first communications device; and
if the granted resource is exclusively occupied by the first communications device, then transmitting the control information via the granted resource on the unlicensed carrier to the second communications device.

3. The method according to claim 2, wherein the copy of the control information is maintained at a Media Access Control (MAC) layer.

4. The method according to claim 2, further comprising:
checking whether an acknowledgement is received from the second communications device in response to the control information that is transmitted via the granted resource on the unlicensed carrier; and
when the acknowledgement is not received from the second communications device:
if there is a granted resource on the licensed carrier, then retransmitting the control information via the granted resource on the licensed carrier to the second communications device using the copy of the control information; otherwise
checking whether there is a granted resource on another unlicensed carrier of the unlicensed spectrum; and
if there is a granted resource on the other unlicensed carrier, then retransmitting the control information via the granted resource on the other unlicensed carrier to the second communications device using the copy of the control information.

5. The method according to claim 4, wherein
the maintaining the copy of the control information further comprises updating the copy of the control information, and
the retransmitting of the copy of the control information comprises transmission of the updated copy of the control information.

6. The method according to claim 4, wherein the retransmitting of the copy of the control information is performed after a predetermined time period elapses since a previous transmission of the control information.

7. The method according to claim 2, further comprising discarding the copy of the control information in response that an acknowledgement is received from the second communications device or in response that the copy has been maintained over a predetermined time period.

8. The method according to claim 1, wherein
the first communications device is a terminal device and the second communications device is a base station; and
the granted resource is indicated by an uplink grant transmitted from the second communications device to the first communications device.

9. The method according to claim 1, wherein the first communications device is a base station and the second communications device is a terminal device.

10. An apparatus for control information transmission at a first communications device configured to utilize both a licensed spectrum and an unlicensed spectrum, the control information for controlling data transmission comprising:
a processor and a non-transitory computer readable storage medium, the non-transitory computer readable storage medium containing instructions, which when executed by the processor, cause the apparatus to:
check whether there is a granted resource on a licensed carrier of the licensed spectrum to transmit the control information to a second communications device that is also configured to utilize both the licensed spectrum and the unlicensed spectrum;
transmit the control information, if there is a granted resource on the licensed carrier, via the granted resource on the licensed carrier to the second communications device;
check whether there is a granted resource on an unlicensed carrier of the unlicensed spectrum to transmit the control information, if there is no granted resource on the licensed carrier to transmit the control information; and
transmit the control information, if there is a granted resource on the unlicensed carrier, via the granted resource on the unlicensed carrier to the second communications device, instead of on the licensed carrier.

11. The apparatus according to claim 10, wherein the instructions, which when executed by the processor, further cause the apparatus to:
maintain a copy of the control information;
check whether the granted resource on the unlicensed carrier is exclusively occupied by the first communications device; and
transmit the control information, if the granted resource is exclusively occupied by the first communications device, via the granted resource on the unlicensed carrier to the second communications device.

12. The apparatus according to claim 11, wherein the copy of the control information is maintained at a Media Access Control (MAC) layer.

13. The apparatus according to claim 11, wherein the instructions, which when executed by the processor, further cause the apparatus to:
check whether an acknowledgement is received from the second communications device in response to the control information that is transmitted via the granted resource on the unlicensed carrier; and
when the acknowledgement is not received from the second communication device:
retransmit the control information, if there is a granted resource on the licensed carrier, via the granted resource on the licensed carrier to the second communications device using the copy of the control information; otherwise
check whether there is a granted resource on another unlicensed carrier of the unlicensed spectrum, if there is no granted resource on the licensed carrier; and
retransmit the control information, if there is a granted resource on the other unlicensed carrier, via the granted resource on the other unlicensed carrier to the second communications device using the copy of the control information.

14. The apparatus according to claim 13, wherein the instructions, which when executed by the processor, further cause the apparatus to:
update the copy of the control information, and
retransmit the copy of the control information by transmission of the updated copy of the control information.

15. The apparatus according to claim 13, wherein the retransmit of the copy of the control information is performed after a predetermined time period elapses since a previous transmission of the control information.

16. The apparatus according to claim 11, wherein the instructions, which when executed by the processor, further cause the apparatus to:
discard the copy of the control information in response that an acknowledgement is received from the second communications device or in response that the copy has been maintained over a predetermined time period.

17. The apparatus according to claim 10, wherein
the first communications device is a terminal device and the second communications device is a base station; and
the granted resource is indicated by an uplink grant transmitted from the second communications device to the first communications device.

18. The apparatus according to claim 10, wherein the first communications device is a base station and the second communications device is a terminal device.

19. A non-transitory computer readable storage medium containing instructions which, when executed by a processor in a first communication device configured to utilize both a licensed spectrum and an unlicensed spectrum, cause control information transmission, wherein the control information is for controlling data transmission, by performing operations comprising:
checking whether there is a granted resource on a licensed carrier of the licensed spectrum to transmit the control information to a second communications device that is also configured to utilize both the licensed spectrum and the unlicensed spectrum;
if there is a granted resource on the licensed carrier, then transmitting the control information via the granted resource on the licensed carrier to the second communications device;
checking whether there is a granted resource on an unlicensed carrier of the unlicensed spectrum to transmit the control information, if there is no granted resource on the licensed carrier to transmit the control information; and
if there is a granted resource on the unlicensed carrier, then transmitting the control information via the granted resource on the unlicensed carrier to the second communications device, instead of on the licensed carrier.

20. The non-transitory computer readable storage medium according to claim 19, wherein the transmitting of the control information via the granted resource on the unlicensed carrier further comprises:
maintaining a copy of the control information;
checking whether the granted resource on the unlicensed carrier is exclusively occupied by the first communications device; and
if the granted resource is exclusively occupied by the first communications device, then transmitting the control information via the granted resource on the unlicensed carrier to the second communications device.

21. The non-transitory computer readable storage medium according to claim 20, wherein the copy of the control information is maintained at a Media Access Control (MAC) layer.

22. The non-transitory computer readable storage medium according to claim 20, wherein the instructions further cause the performing of operations comprising:
checking whether an acknowledgement is received from the second communications device in response to the control information that is transmitted via the granted resource on the unlicensed carrier; and
when the acknowledgement is not received from the second communications device:
if there is a granted resource on the licensed carrier, then retransmitting the control information via the granted resource on the licensed carrier to the second communications device using the copy of the control information; otherwise
checking whether there is a granted resource on another unlicensed carrier of the unlicensed spectrum; and
if there is a granted resource on the other unlicensed carrier, then retransmitting the control information via the granted resource on the other unlicensed carrier to the second communications device using the copy of the control information.

23. The non-transitory computer readable storage medium according to claim 22, wherein
the maintaining the copy of the control information further comprises updating the copy of the control information, and
the retransmitting of the copy of the control information comprises transmission of the updated copy of the control information.

24. The non-transitory computer readable storage medium according to claim 22, wherein the retransmitting of the copy of the control information is performed after a predetermined time period elapses since a previous transmission of the control information.

25. The non-transitory computer readable storage medium according to claim 20, further comprising discarding the copy of the control information in response that an acknowledgement is received from the communications device or in response that the copy has been maintained over a second predetermined time period.

26. The non-transitory computer readable storage medium according to claim 19, wherein
the first communications device is a terminal device and the second communications device is a base station; and
the granted resource is indicated by an uplink grant transmitted from the second communications device to the first communications device.

27. The non-transitory computer readable storage medium according to claim 19, wherein the first communications device is a base station and the second communications device is a terminal device.

* * * * *